Patented Apr. 27, 1937

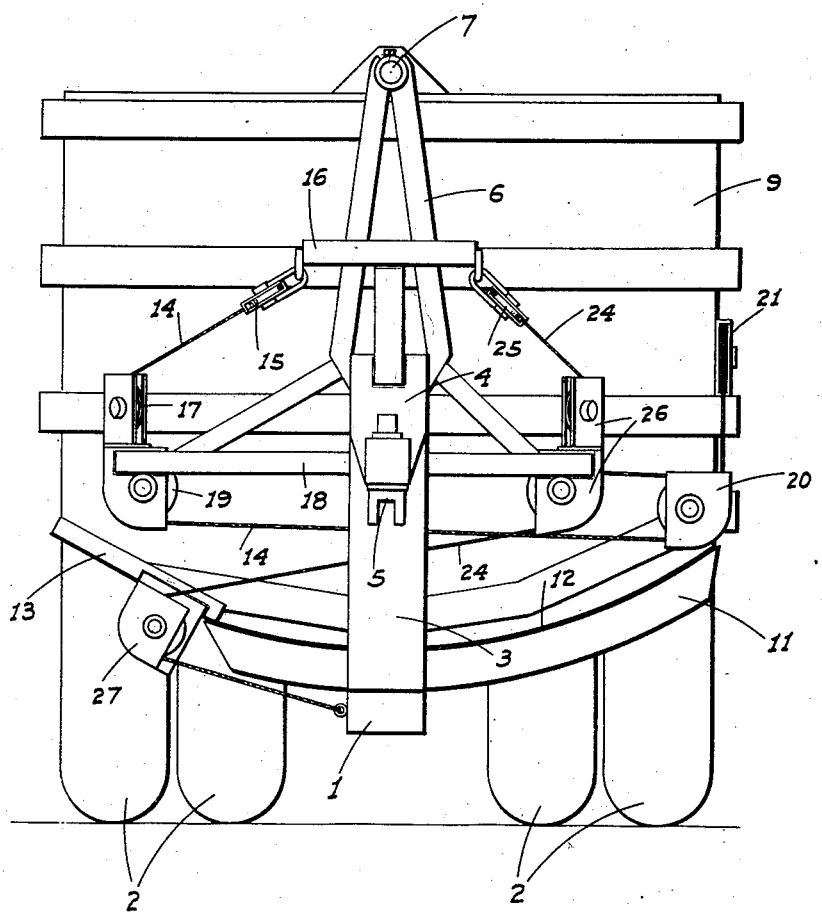

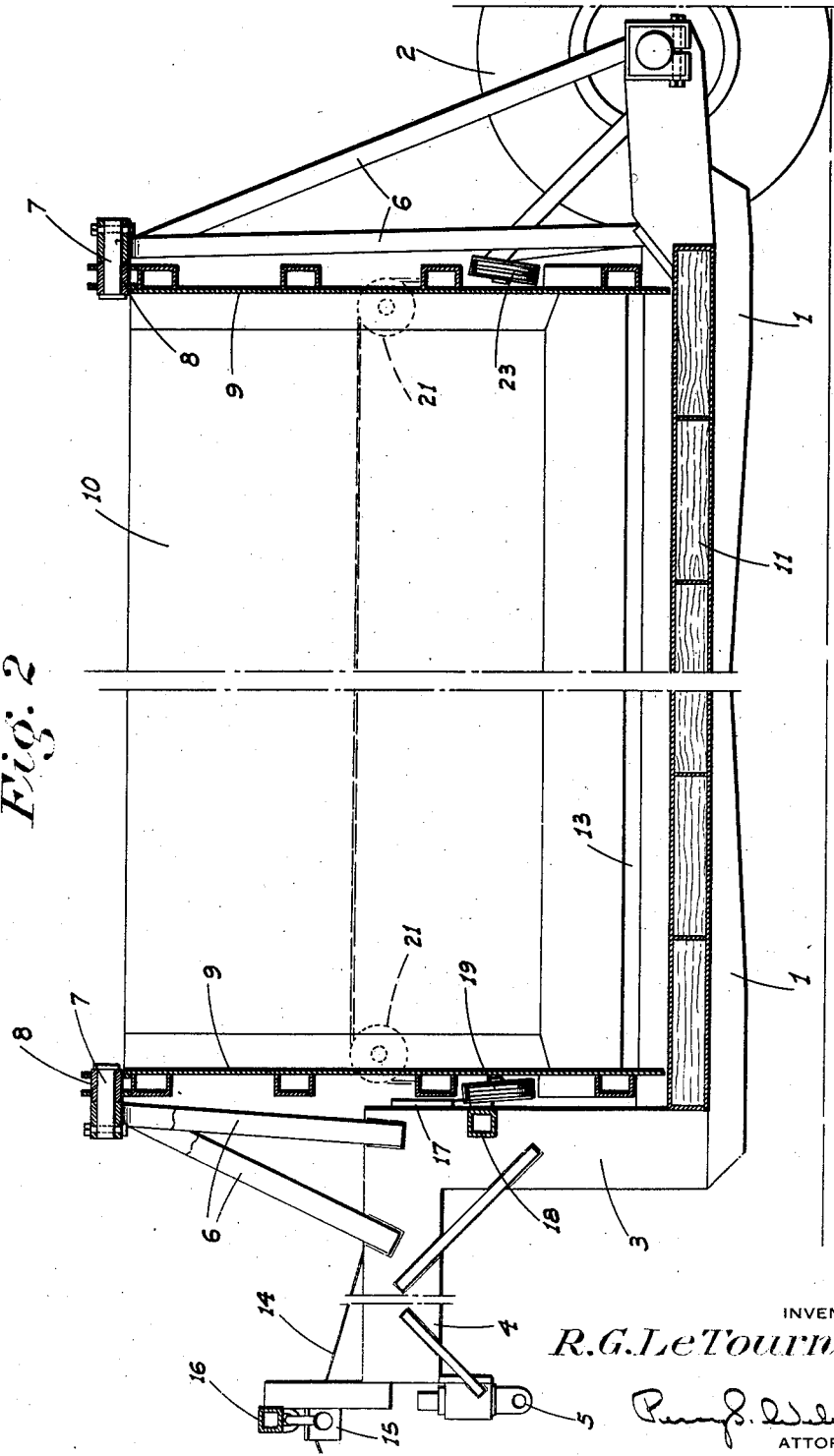

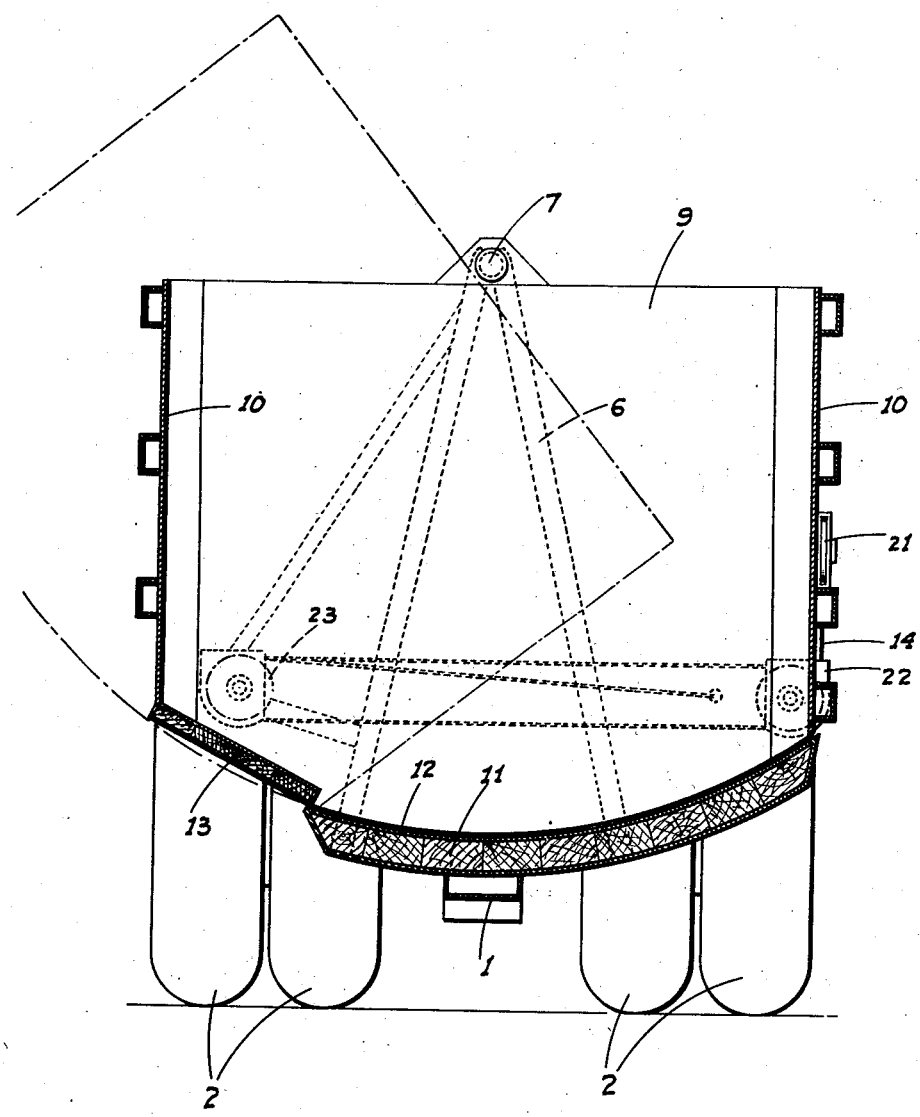

2,078,332

UNITED STATES PATENT OFFICE 2,078,332

EARTH CARRYING VEHICLE

Robert G. Le Tourneau, Stockton, Calif., assignor to R. G. Le Tourneau, Inc., Stockton, Calif., a corporation of California Application February 24, 1936, Serial No. 65,243

2 Claims. (Cl. 298—27)

This invention relates to earth carrying and dumping vehicles, and particularly to one of large carrying capacity.

The discharge of the dirt is effected by a substantially horizontal movement of the vehicle body.

In this respect the present structure is the same in general principle of operation as that shown in my Patent No. 1,969,933, dated August 14, 1934, in which the body moved rearwardly relative to the floor or bed and so discharged the dirt onto the ground rearwardly of the vehicle.

My principal object now is to provide a laterally or sidewise discharging vehicle operating substantially on the above principle, but so that the load can be conveniently discharged down a bank or onto the side of a fill without the vehicle having to be maneuvered into a position at right angles to such bank or fill.

Another object is to so mount the movable body and to control the movements thereof so that the structure as a whole is more compact than was previously the case.

These objects I accomplish by means of such structure and relative arrangement of parts as will fully appear by a perusal of the following specification and claims.

In the drawings similar characters of reference indicate corresponding parts in the several views:

Figure 1 is a front end view of my improved vehicle.

Figure 2 is a longitudinal view of the same.

Figure 3 is a transverse section of the vehicle.

Referring now more particularly to the characters of reference on the drawings, the vehicle comprises a relatively low longitudinal and central frame beam 1 supported at its rear end by transversely spaced dual wheel units 2. At its front end the beam is rigid with an upstanding arm 3 from the upper end of which a rigid tongue 4 projects forwardly. The tongue at its forward end is provided with a depending swivel clevis 5, adapted either for connection to a swivel wheeled truck or to the rear end of a tractor as will be found most practicable.

Upstanding from the arm 3 and beam 1 adjacent its rear end are standards 6 on the upper ends of which are supported axially alined trunnions 7, disposed in a transverse plane in vertical alinement with the beam. The trunnions turn in boxes 8 rigid with the opposed end walls 9 of the vehicle body adjacent the upper edge thereof. Said body includes the end walls which are parallel to each other and side walls 10 also parallel to each other.

The main bed member 11 of the vehicle, which forms the bottom of the body, is preferably formed of spaced metal plates with wood fillers therebetween, and is rigidly secured to the beam 1. Said bed is curved on an arc centered with the trunnions 7, the lower edges of the end walls 9 of the body being similarly curved as at 12 in close proximity to the upper surface of the bed as shown in Figure 3. The bed 11 extends from one side wall of the body when the latter is in its normal vertical position to a termination short of the opposite side of the body; the space between said opposite side and the adjacent edge of the bed being covered by a sloping bottom member 13 formed with the body and overlapping said edge of the bed.

It will therefore be seen that the body is swingably suspended from the trunnions for lateral swinging movement. If the body is swung in a direction such that the bottom 13 moves away from the bed 11, a space the full length of the body will be formed between the bed and bottom for the downward discharge of dirt, and the opposite side wall of the body will push the dirt across the bed and through said opening. The bed 11 terminating short of the one side of the body allows the dirt to be completely discharged from the body without excessive lateral movement of the same being necessary. Also no interference with the effective discharge of the dirt is had, since as the body bottom member 13 swings upwardly it moves toward a vertical position and any dirt previously supported thereon will of course slide onto the ground. At the same time as the opposed side wall reaches the discharge edge of the bed 11 it remains at an upward angle of sufficient degree to prevent any dirt remaining thereon.

The body may be thus swung by different mechanical means but I preferably employ cables, one to move the body to a discharge position, and the other to return it to a normal position; such cables leading from the tractor to which the vehicle is attached and being connected to the drums of the power unit shown in my Patent No. 1,912,645, dated June 6, 1933.

The cable 14 for swinging the body to a discharge position extends from the tractor to a cross swivel pulley 15 mounted on one end of a cross bar 16 rigid with and above the tongue at its forward end and on the same side as that toward which the body is to swing. The cable then passes about a direction changing sheave 17 mounted on the corresponding end of a cross bar 18 projecting from the arm 3, and is then wrapped about a multiple pulley sheave 19 fixed on said bar adjacent the sheave 17, and about a similar sheave 20 fixed on the end of the body at its opposite side.

The cable then extends over direction changing sheaves 21 mounted on the sides of the body to and about a multiple pulley sheave 22 corresponding in position and mounting to the sheave 23 corresponding to the sheave 19 and mounted in fixed connection with the adjacent standard 6 and the beam 1. The cable is then dead ended or anchored on the end wall of the body adjacent the sheave 22, as indicated in Figure 3.

It will thus be seen that with a pull on the cable the body will be swung to a discharge position with a force of leverage depending on the number of pulleys in the sheaves. Also with this arrangement the same pressure or pull is exerted on both ends of the body simultaneously so that twisting strains on the body are avoided.

For returning the body to its normal position the cable need only be applied to one end of the body since it is then light and tends of itself to return to such position. For this purpose another cable 24 from the tractor power unit passes over a swing pulley 25 mounted on the opposite end of the cross bar 16, then over direction changing pulleys 26 mounted on the corresponding end of the bar 18, then about a swing pulley sheave 27 mounted on the end of the body adjacent the bottom member 13 and then to an anchorage on the beam 1 or adjacent part. When the body has been swung upwardly to a discharge position, a pull on this previously slack cable 24 will cause the body to be positively returned to its normal position as will be evident.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. An earth carrying dump vehicle comprising a bed, a mainly bottomless body mounted on the bed, means supporting the body for swinging movement in a vertical plane transversely of the bed and means to swing the body in one direction which includes sheaves fixed with the bed beyond the ends of the body and laterally offset from the central plane of the body on that side toward which the body is to be swung, sheaves mounted on the ends of the body adjacent the opposite side of the same, direction changing pulleys mounted on said side of the body, and a pull cable extending first about the sheaves at one end of the body, then along said opposite side of the body about said direction changing pulleys, and then over the sheaves at the other end of the body to an anchorage on the body between the adjacent sheaves.

2. An earth carrying dump vehicle comprising a mainly bottomless body, pivot means mounting the body for lateral swinging movement from a normal vertical position, a fixed bed under the body whose upper surface is curved about the pivot means as an axis and extending from one side of the body to a termination short of the opposite side of the body, a bottom member mounted on the body and extending from said opposite side to a termination adjacent the corresponding edge of the bed, and means to swing the body in a direction to open a gap between said bed and bottom member.

ROBERT G. LE TOURNEAU.